Figure 1:
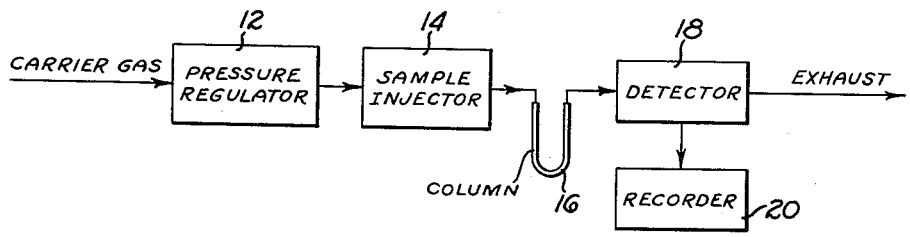

Feb. 16, 1965   W. S. GALLAWAY ETAL   3,169,832
GAS CHROMATOGRAPHY PROCESS
Filed April 24, 1961

INVENTORS.
WILLIAM S. GALLAWAY
JAMES C. STERNBERG
BY THEIR ATTORNEYS.
HARRIS, KIECH, RUSSELL & KERN 3,169,832
GAS CHROMATOGRAPHY PROCESS
William S. Gallaway and James C. Sternberg, Fullerton, Calif., assignors to Beckman Instruments, Inc., a corporation of California
Filed Apr. 24, 1961, Ser. No. 105,032
4 Claims. (Cl. 23—232)

This invention relates to gas chromatography and more particularly provides an improved method or technique permitting the quantitative detection of a normally unresponsive component contained in a carrier gas stream flowing from a gas chromatograph column into an ionization detector.

The apparatus used in conventional gas chromatography consists of a column containing an inert granular solid, e.g., diatomaceous earth or ground fire brick, which serves as a support for a stationary partition agent. The immobile phase is a liquid of low volatility, for instance silicone oil or some other suitable partition agent of high boiling point. A flow of a nonreactive gas, for example, nitrogen, usually called a carrier gas, is passed through the column and a small sample of the mixture to be analyzed is injected into the gas stream immediately preceding the column. The components of the sample are transported through the column by the carrier gas with speeds which depend upon the volatilities of their mixtures with the immobile phase. The components of the sample then emerge individually from the column and can be detected at the exit by some suitable device; for example, an ionization detector which selectively ionizes the individual sample components, the amount of ionization being a quantitative measure of the sample component present. By choosing proper immobile liquids, the components of the sample which have the same boiling point but a different structure may be separated. Gas chromatography has as its chief advantages speed, ease of execution and the small size of sample required.

The use of ionization detectors such as the hydrogen flame detector provides extremely high sensitivity for detection of most organic vapors, and such detectors have found widespread application. The application of ionization detectors to certain gas analyses has been somewhat limited, however, by their lack of response to certain substances. Among these are such industrially important substances as carbon monoxide, carbon dioxide, water, ammonia, nitrogen, the noble gases, the oxides of nitrogen, the halogens, and the hydrogen halides. It has heretofore been necessary to use less sensitive detectors, such as thermal conductivity cells, for analysis of mixtures containing these gases, even where the high sensitivity of the ionization detectors could advantageously have been applied to detection of other components of the sample mixture. This shortcoming of the ionization detectors has limited their applications to many uses where they would otherwise be desirably employed.

The carrier gas employed for delivery of the sample to the chromatograph column and the transport of the individual components of the sample from the column to the detector is normally characterized by low ionization response to the flame or other ionizing means. In the instance of a flame ionization detector, the gas fuel mixed with the sample carrier gas stream also exhibits a low ionization in the flame. It will be understood that both the fuel gas and the carrier gas are purposely selected for their low ionization in order that the ionization occurring in the flame may be principally attributable to the sample component. The carrier gas and fuel gas, in other words, provide a very low and unobjectionable background signal. That is to say, most of the ionization and most of the flame detector signal are due to the sample component. The hydrogen flame ionization detector is described in some detail in Gas Chromatography, McWilliams and Dewar, Amsterdam, 1958, Academic Press, Inc., New York.

It has now been found that it is possible to modify the gas chromatography technique to permit the quantitative detection, in an ionization detector such as a hydrogen flame detector, of a normally unresponsive component contained in the carrier gas stream flowing from the gas chromatograph column to the ionization detector. The improved technique involves the inclusion of a readily ionizable material in the carrier gas stream to the chromatograph column. It will be appreciated that the detector with the incorporation of the ionizing additive in the carrier gas stream will have a continuous background signal of a magnitude heretofore considered undesirable. It is the presence of this significant background signal that permits detection of the normally unresponsive components of the sample.

It is fundamental in gas chromatography that at the instant of the exit of a component compound of the sample from the chromatograph column there is a decreased volume flow of the carrier gas itself in an inverse proportion to the amount of sample component. In the improved process of the invention, the carrier gas stream contains as one of its components a small amount of an ionizable material. This being so, it will be appreciated that the background signal, which in the improved process is of some magnitude, will with the delivery of a normally unresponsive component such as carbon monoxide to the ionization detector evidence a decrease in strength proportionate to the quantity of the unresponsive component. Thus, it is seen that the use of an inert gas carrier "doped" with an ionizing additive renders an ionization detector sensitive to normally unresponsive vapors. The sensitivity of the improved gas chromatography technique is at least comparable to that obtainable with the use of the best available thermal conductivity detectors.

Various ionizable materials may be used as the additive in the carrier gas stream but, for the most uses, it develops that methane is the ideal additive. However, if a detector is being employed to monitor repeatedly a sample of known and few components, it may be desirable or permissible to use an ionizable additive other than methane. The ionizable material employed is included as a minor portion of the volume of the carrier gas stream and will normally be used in an amount of 0.0001 to 0.02 volume fraction of the carrier gas. Methane for example is normally employed in a volume fraction of 0.01 of the carrier gas without sample.

The foregoing objects and advantages of the invention, together with various other objects and advantages will become evident to those skilled in the art in light of the following disclosure and drawing. The drawing merely shows and the description describes a preferred embodiment of the process of the present invention.

Figure 2:
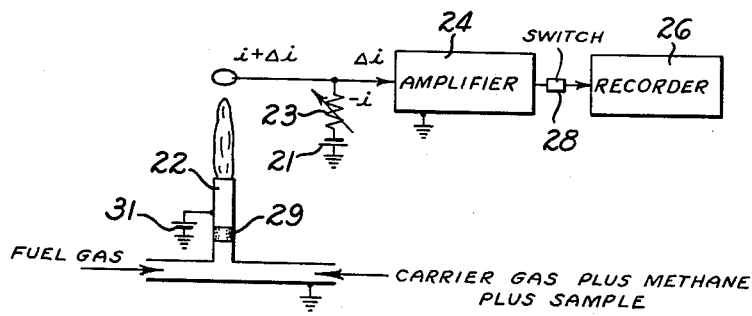
Figure 3:
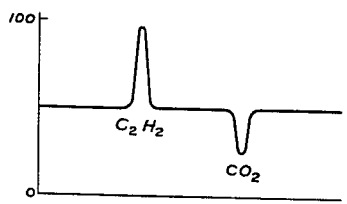
Figure 4:
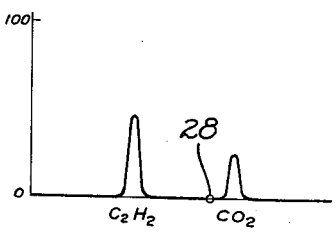

In the drawing:
FIG. 1 is a block diagram illustrating the use of an ionization detector including a recorder with a gas chromatograph;
FIG. 2 is a schematic representation of an ionization detector of the flame type;
FIG. 3 is a portion of an analysis chart of a flame ionization detector wherein there is depicted a steady background signal attributable to the incorporation of an ionizable additive in the carrier gas stream, followed by an increased signal caused by acetylene and by a decreased signal which occurs with passage of normally unresponsive carbon dioxide to the detector; and
FIG. 4 is another analysis chart of a flame ionization detector wherein the steady background signal has been blocked out with a suppression voltage and where provision is made for reversing the leads to the recorder with passage of an unresponsive component such as $CO_2$ to the detector in order that all signals may be recorded positively.

FIG. 1 shows a typical arrangement of a gas chromatograph including a pressure regulator or flow controller 12, a sample injector 14, a chromatograph column 16, a detector 18 which may be a flame ionization detector as illustrated in FIG. 2 or other type, and a recorder 20. The flow of a carrier gas which may be argon, helium, nitrogen or carbon dioxide is controlled by the pressure regulator 12. At a particular time, a quantity of sample is injected into the carrier gas at the sample injector 14 and components of the sample are separated as the sample moves through the column 16. The detector 18 provides an output indicating the presence of a sample component in the column effluent; said output may be used as a quantitative measure of the component. The detector output is ordinarily recorded in some form for subsequent review, although the output may be merely indicated for contemporaneous visual inspection.

In the improved process of the invention a small amount of an ionizable material, preferably methane, is included in the carrier gas stream to the chromatograph column 16. The carrier gas may be obtained from the vendor with the desired proportion of the additive included, or any desired proportion of additive may be continuously blended into the carrier stream before the column.

A typical flame ionization detector is illustrated schematically in FIG. 2 and comprises a burner jet 22 into which a stream of combined fuel gas, e.g., hydrogen, and the column effluent enters. The carrier gas carries the sample component from the chromatograph column 16 and also includes, as mentioned before, a small amount of an ionizable material, preferably methane. Both the fuel gas and the carrier gas within the flame undergo little ionization; however, the methane or other additive does ionize and provides a continuous background response current. In FIG. 2 the background response current attributable to the additive plus the small amount of ionization occurring in the fuel gas is indicated by the symbol $i$. The change in current response attributable to the presence of the sample component is designated by $\Delta i$. When the carrier gas presents an ionizable sample component to the flame such as acetylene, $C_2H_2$ (see FIG. 3), there occurs at that time significant ionization which prompts the flow of a considerably larger current $i+\Delta i$ to an amplifier 24. A suitable recorder 26 is provided for permanently recording the current. The burner jet 22 which is separated from the intake line by an insulator collar 29 is connected through a battery 31 to ground, which battery provides a polarizing voltage. When a nonresponsive material such as carbon monoxide, carbon dioxide, ammonia or the like passes to the detector, there occurs, as earlier explained, an actual decrease in current from that normally experienced with the passage of doped carrier gas to the detector. This is so because the amount of ionizable additive (methane) reaching the detector 18 decreases with the appearance of a sample component within the detector; there being less methane, the background signal drops proportionately to the amount of nonresponsive component present. It will be seen in FIG. 3 that the presence of carbon dioxide results in a negative peak. In FIG. 3, the recorder displays total detector signal, so that the background current falls near midscale, and positive and negative peaks are observable.

For the quantity detection of sample components present in small amounts, it is desirable to suppress the background current to permit setting the amplifier 24 to a large gain. The analysis chart of FIG. 4 has a bottom zero from which the peaks depart. The detector in this instance is provided with a bucking current $-i$ by a battery 21 through an adjustable resistor 23 in opposition to the background current $i$ in order that only the sample current $\Delta i$ is amplified by the amplifier 24 and recorded on the recorder 26. It will be appreciated that with the entrance of a nonresponsive component such as carbon dioxide or ammonia into the detector, there would be with the arrangement of FIG. 4 (which has a bottom zero) no adequate recording of its peak. To remedy the situation a switch 28 is provided which with its actuation permits the recording of the carbon dioxide as a positive peak.

Various ionizable materials particularly hydrocarbon compounds may be used in the place of the methane additive to the carrier gas stream. Methane is the preferred material since it, as a one carbon compound, provides a lower response per mole. Other hydrocarbons are available for use, but to a less advantage since, for example, propane would diminish response to a sample containing two carbon material. Methane is less easily condensed than other available ionizing materials which is a decided advantage.

The following mathematical analysis is offered to further the understanding of the process of the invention and to assist in the judicious selection of a suitable ionizable additive to be incorporated into a carrier gas stream for a particular analysis. It will be appreciated that the suitability of an ionizable material will depend to a large extent on the particular analysis. Hereinafter the term "doped carrier" is used to describe a carrier gas carrying a small amount of the ionizable additive. The mathematical analysis follows:

$i_0 = i_B + f_A^0 S_A F$
$i = i_B + f_A^0 S_A F + (S_x - f_A^0 S_A) f_x F$
$\Delta i = i - i_0 = (S_x - f_A^0 S_A) f_x F$ where $i_0$ = detector response current, amperes, with doped carrier.
$i_B$ = background current, amperes, with undoped carrier gas.
$i$ = detector response current, amperes, with doped carrier containing sample component.
$\Delta i$ = change in response current, amperes, due to presence of sample component.
$f_A^0$ = volume fraction (mole fraction) of ionizable additive in carrier gas without sample.
$f_x$ = instantaneous volume fraction (mole fraction) of sample component in column effluent.
$S_A$ = sensitivity of detector to additive, coul./cc. of gas.
$S_x$ = sensitivity of detector to sample component, coul./cc. of gas.
$F$ = volume flow rate of column effluent to detector, cc/sec.

The response current change $\Delta i$, due to the presence of the sample component, is seen to be a linear function of the rate of sample introduction into the flame; that is, $\Delta i$ increases or decreases in direct proportion to the term $f_x F$. The effective sensitivity, $S_x^{eff}$, of the detector to the particular sample component may be defined as:
$S_x^{eff} = S_x - f_A^0 S_A$,
so that $$\frac{S_x^{eff}}{S_A} = \frac{S_x}{S_A} - f_A^0$$

It is seen that for unresponsive components which give no signal in the flame ($S_x = 0$), there is obtained with the addition of the ionizable material to the carrier gas stream an effective response equal to a fraction, $f_A^0$, of the response to the additive ($S_A$). It will be noted that there is an appreciable loss in effective sensitivity in the doped flame as compared to the normal flame for sample components having a normal sensitivity, $S_x$, in the range of $\frac{1}{2} f_A^0 S_A$ to $2 f_A^0 S_A$. Within the foregoing range, the sensitivity in the doped flame is less than one-half the sensitivity in the normal or undoped flame, and the sensitivity in the doped flame goes to zero for $S_x = f_A^0 S_A$. If the normal sensitivity is greater than $2 f_A^0 S_A$, the effective sensitivity, $S_x^{eff}$ is greater than one-half the normal sensitivity, rapidly approaching the normal sensitivity as the normal sensitivity increases. When the normal sensitivity is less than $\frac{1}{2} f_A^0 S_A$, the effective sensitivity in the doped flame rapidly overtakes the normal sensitivity, and approaches the limit $f_A{}^0 S_A$ as the normal sensitivity approaches zero.

Through judicious selection of the additive and the fraction, $f_A{}^0$, of the additive introduced into the carrier gas, it is possible to obtain good sensitivity to normally undetectable or unresponsive sample components without significant loss in response to the normally detectable samples. The linearity of the flame detector would be particularly advantageous for the normally unresponsive samples, since linear response to these samples would be obtained from zero to 100% of these components in the carrier gas if $f_A{}^0$ were selected to fall within the linear response range. Use of higher values of $f_A{}^0$ would be permitted if stream splitting between column and detector were employed. Without stream splitting, the higher the value of $f_A{}^0$ employed the better the response to normally unresponsive components and the poorer the response and more limited the range of linearity of response to the normally ionizable components. Increasing $f_A{}^0$ and decreasing F by the same factor (possibly by stream splitting) will decrease the response to ionizable compounds without altering response to nonionizable compounds.

Methane, in nearly all instances, appears to be an ideal choice for the additive, since as a one-carbon component it has lower response than other hydrocarbons and would throw virtually no components into the range of appreciably reduced sensitivity ($\frac{1}{2} f_A{}^0 S_A$ to $2 f_A{}^0 S_A$) for the most probable choice of $f_A{}^0 = 0.01$. This choice would give 99% or better sensitivity to all hydrocarbons (including methane) and to most other organic compounds while reducing the linear range for these components by only about a factor of 2 without employing stream splitting. At the same time, response to normally unresponsive components would become 0.01 $S_A$, which would give approximately 100 times the response to these components obtainable by thermal conductivity methods, with linearity over the full zero to 100% range.

Although an exemplary embodiment of the invention has been disclosed herein for purposes of illustration, it will be understood that various changes, modifications, and substitutions may be incorporated in such embodiment without departing from the spirit of the invention as defined by the claims which follow.

We claim:
1. In an improved gas chromatography process permitting the quantity detection in a flame ionization detector of a normally unresponsive component contained in a carrier gas stream flowing from a gas chromatograph column to said flame ionization detector, the step comprising:
   continuously supplying a normally responsive material in the carrier gas stream to the column, said normally responsive material being a substantially fixed volume fraction of the carrier gas stream before the normally unresponsive component is injected therein, the normally unresponsive component displacing a quantity of said normally responsive component to produce a response in the flame ionization detector characteristic of the resulting decrement in quantity of said normally responsive component.

2. An improved gas chromatography process permitting the quantity detection in a flame ionization detector of a normally unresponsive component contained in a carrier gas stream flowing from a gas chromatograph column to said flame ionization detector, comprising:
   continuously supplying a readily ionizable material in the carrier gas stream to the chromatograph column, said ionizable material being a minor volume fraction of the carrier gas stream.

3. An improved process in accordance with claim 2 wherein the normally unresponsive component is selected from the group consisting of carbon monoxide, carbon dioxide, water, hydrogen and oxides of nitrogen.

4. An improved process in accordance with claim 2 wherein methane is added as the readily ionizable material.

References Cited in the file of this patent
UNITED STATES PATENTS
2,511,177   Richardson _____ June 13, 1950

OTHER REFERENCES
Willis: "Nature" 184, 894 (1959).
Willis: "Nature" 183, 1754 (1959).